United States Patent [19]

Yoshino et al.

[11] 4,207,113
[45] Jun. 10, 1980

[54] INORGANIC FOAM AND PREPARATION THEREOF

[75] Inventors: Akira Yoshino, Yokohama; Isamu Iwami, Zushi, both of Japan

[73] Assignee: Asahi-Dow Limited, Tokyo, Japan

[21] Appl. No.: 858,425

[22] Filed: Dec. 7, 1977

[30] Foreign Application Priority Data

Dec. 17, 1976 [JP] Japan ............................. 51/150815

[51] Int. Cl.² ................................................ C04B 21/00
[52] U.S. Cl. .................................... 106/40 R; 252/62
[58] Field of Search ........................ 106/40 R; 252/62

[56] References Cited

U.S. PATENT DOCUMENTS

| | | | |
|---|---|---|---|
| 3,148,996 | 9/1964 | Vukasovich et al. | 106/40 R |
| 3,223,537 | 12/1965 | Wiegert et al. | 106/4 R |
| 3,223,538 | 12/1965 | Wiegert et al. | 106/40 R |
| 3,261,696 | 7/1966 | Wiegert et al. | 106/40 R |
| 3,330,675 | 7/1967 | Magder | 106/40 R |
| 3,382,082 | 5/1968 | Eubanks et al. | 106/40 R |
| 3,625,723 | 12/1971 | Sicka | 106/40 R |
| 3,762,935 | 10/1973 | Leach | 106/40 R |

*Primary Examiner*—John H. Mack
*Assistant Examiner*—Mark Bell
*Attorney, Agent, or Firm*—Armstrong, Nikaido, Marmelstein & Kubovcik

[57] ABSTRACT

A highly expanded inorganic foam containing discrete cells with an average diameter of 3 mm or less, being non-flammable with excellent thermal insulating property, heat resistant property as well as water resistance is found to be prepared by foaming and setting simultaneously at normal temperature by adding a suitable amount of a polyvalent metal carbonate to a stable aqueous solution dispersion of a metal phosphate with a specific atomic ratio of metal to phosphorus and a specific ratio of metal valences relative to phosphate ion valences.

18 Claims, 3 Drawing Figures

INORGANIC FOAM AND PREPARATION THEREOF

This invention relates to a novel inorganic foamed material and a process for producing the same. More particularly, this invention is concerned with a novel inorganic foam comprising metallic salts of phosphoric acid, containing discrete cells of closed cellular structure with a high degree of expansion ratio and being uninflammable with excellent thermal insulating and heat-resistant properties and also to a process for producing the same under conditions of normal pressure and temperature.

Organic foamed materials such as polyurethane foams, polystyrene foams or polyethylene foams have been known to have excellent thermal insulating properties and are useful for various materials such as construction materials, various lagging materials, etc. Among them, compositions for polyurethane foams are foamable and settable at normal temperature and very useful when structural fabrication is to be accomplished at the site at which the compositions are prepared. All of these materials, however, are inflammable since they are organic in nature and also have no satisfactory thermal resistance. In particular, damages caused by soot and toxic gases generated from organic materials at the time of fire are becoming great problems in recent years. In the field of thermal insulating materials, there have been made great efforts to make them non-flammable.

On the other hand, inorganic foams such as glass foams, light porous concrete and the like have also been developed as materials excellent in non-flammability and heat resistance. Any of these materials is produced under conditions of high temperature and high pressure to result in products of open cellular structure, which are high in water absorption and inferior in thermal insulating property. Furthermore, such a method involves a drawback that there can be produced only products of limited shapes.

U.S. Pat. No. 3,148,996 (Vukasovich et al) discloses a composition for inorganic foams, which is foamable and settable at normal temperature, comprising an acidic metal phosphate such as acidic aluminum phosphate, fine powders of calcium silicate and a liquid vehicle such as water. According to a typical example, 50 parts by weight of an aqueous aluminum phosphate solution are mixed with 50 parts by weight (in amounts sufficient to set completely said aluminum phosphate solution) of calcium silicate powders and, after partial setting of the mixture, about 5 parts by weight of calcium carbonate are added to the mixture to effect foaming, whereby a foamed product having specific gravity of 0.29 is obtained.

U.S. Pat. No. 3,330,675 (Magder) discloses another composition for inorganic foams, which is improved in several physical properties over the composition of Vukasovich et al, by replacing calcium silicate in Vukasovich et al with a basic compound which completely neutralizes free $P_2O_5$ in acidic aluminum phosphate solution. The density of the foamed product obtained from this composition is as high as 0.41 g/cm³ at its minimum.

The object of the present invention is to provide an inorganic foamed material with a high degree of foaming having a specific gravity of 0.15 or less, containing discrete cells and being non-flammable with excellent thermal insulating as well as thermal resistant properties and also to provide a process for producing the same.

It has now been found that an aqueous acidic solution of a metal phosphate having specific atomic ratio of metals to phosphorus (M/P ratio) and specific equivalent ratio (E ratio) can be foamed with a basic metal carbonate excellently to give a foamed product with a high degree of expansion. The present invention has been accomplished based on such a finding.

The particular feature of the process of the present invention resides in that there is first formed a stable aqueous solution of metal phosphate having specific M/P ratio and E ratio which is not self-settable even on storage for a long time and the thus formed stable solution is then subjected to simultaneous foaming and setting by addition of a basic carbonate of polyvalent metals. In contrast, according to the processes of prior art as mentioned above for producing foamed inorganic materials, it is essentially required to use stoichiometric amounts (i.e. E ratio = 1) of hardening agents (calcium silicate or basic compound) to effect complete hardening of the phosphate composition. Further, foaming is commenced after hardening has proceeded to some extent or alternatively foaming and setting are commenced simultaneously by mixing at the same time the hardening agent and the foaming agent with the phosphate composition. It is entirely unexpected that a highly expanded foam can be produced by simultaneous foaming and setting of a stable aqueous metal phosphate solution specifically prepared according to the present invention.

According to the present invention, there is provided an inorganic foam comprising metallic salts of phosphoric acid, being characterized in that:

(a) the ratio of the total number of metal atoms constituting said salts to that of phosphorus atoms is in the range from ⅔ to 2/1;

(b) the metals constituting said salts comprises polyvalent metals and have a composition such that the equivalent ratio of the total valences of metals relative to the total valences of phosphate ion is from 0.65 to 0.95;

(c) said foam contains discrete cells with an average diameter of 3 mm or less; and (d) said foam has a specific gravity of 0.15 or less.

The inorganic foam provided by the present invention is distinguished in structure from any of the inorganic foams known in the art. The difference may be better understood by referring to the accompanying drawings, in which.

Figure 1:
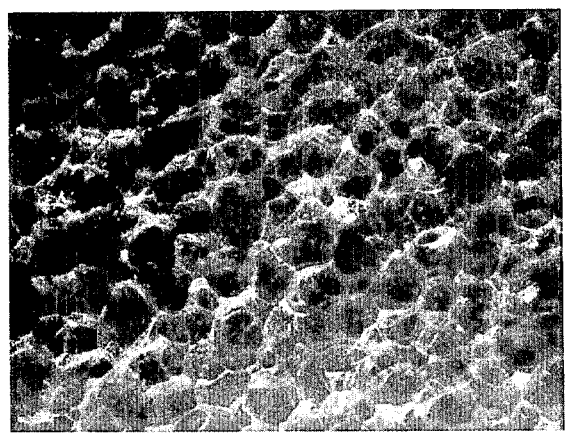
FIG. 1 shows a microscopic photograph (X 13) of a cross-section of the foamed product (Example 8) of the present invention.
Figure 2:
FIG. 2 shows a microscopic photograph (X 13) of a cross-section of the foamed product produced by foaming at normal temperature according to the process of prior art (Comparative example 6)
Figure 3:
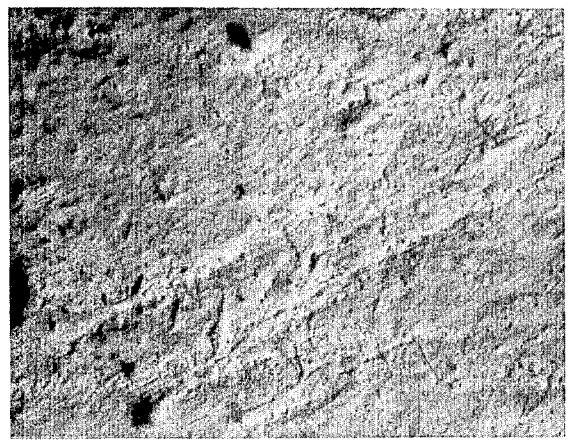
FIG. 3 shows a microscopic photograph (X 13) of a cross-section of commercially available calcium silicate board produced under conditions of a high pressure and a high temperature.

By comparison between FIG. 1, FIG. 2 and FIG. 3, it is apparently seen that the cells of the foam according to the present invention are discrete and uniform in size as compared with those of prior art as shown in FIG. 2 and FIG. 3, indicating a high degree of expansion ratio of the foam according to the present invention. Due to such a difference in structure, the foam provided by the present invention is novel foam having a low specific gravity, excellent thermal insulating and heat resistant properties and being low in water absorption.

The inorganic foam of the present invention can be produced by a process which comprises allowing a mixture comprising (A) a metal phosphate containing at least one polyvalent metal the ratio of the total number of metallic atoms to the number of phosphorus atoms in said metal phosphate being from $\frac{1}{3}$ to 3/2 and the equivalent ratio of the total valences of the metallic atoms to the total valences of phosphate ion in said metal phosphate from $\frac{1}{3}$ to $\frac{3}{4}$; (B) a polyvalent metal carbonate and (C) water to foam and set at normal temperature, the amount of the polyvalent metal carbonate being controlled within the range such that the ratio of the total number of metallic atoms to the number of phosphorus atoms in the resultant foam may be from $\frac{2}{3}$ to 2/1 and the equivalent ratio of the total valences of metals relative to the total valences of phosphate ion in said resultant foam may be from 0.65 to 0.95.

The process according to the present invention can be generally practiced by foaming a composition comprising 100 parts by weight of the metallic phosphoric acid salt or double salt (A), 5 to 50 parts by weight of the carbonate (B) and 20 to 200 parts by weight of water (C).

Typical examples of the polyvalent metal phosphate (A) to be used in the present invention are primary phosphates, e.g. primary magnesium phosphate, primary calcium phosphate, primary strontium phosphate, primary barium phosphate, primary zinc phosphate, primary aluminum phosphate, etc. and a mixture of said primary polyvalent metal phosphate with a secondary phosphate, tertiary phosphate or pyrophosphate of such metals as magnesium, calcium, strontium, barium, aluminum, zinc, iron, manganese, etc. These polyvalent metal phosphates may optionally be modified with oxides, hydroxides or silicates of mono- or polyvalent metals such as alkali metals (e.g. lithium, sodium, potassium), magnesium, calcium, strontium, barium, aluminum, zinc, iron, manganese, etc.

Thus, the polyvalent metal in the metal phosphate is generally selected from di-valent and tri-valent metals. Among them, magnesium, zinc and aluminum are preferred from the standpoint of mechanical strength of the foam obtained. Calcium is also preferably used since it is available at low cost.

Of course, the above metal phosphates can be obtained directly from the reaction between an aqueous phosphoric acid solution and oxides, hydroxides or salts of said metals. In any case, it is critical that the ratio of the total number of metal atoms (M atom) to the number of phosphorus atoms (P atom) in the metal phosphate is required to be M/P=$\frac{1}{3}$ to 3/2.

If M/P ratio in the starting metal phosphate is less than $\frac{1}{3}$, setting reaction accompanied at the time of foaming does not proceed sufficiently and it is difficult to maintain a good balance between foaming and setting. As the result, it is difficult to obtain a foamed product having uniform and fine foamed cells but there is obtained only foamed products inferior in water resistance and heat resistance. On the contrary, with M/P ratio exceeding 3/2, the aqueous solution of such a salt is extremely unstable. In other words, the aqueous solution tends to be self-settable, whereby it is also difficult to to maintain a good balance between foaming and setting with the result that there is obtained only a foamed product with low degree of expansion.

Furthermore, the equivalent ratio E, which is defined as the total valences of metals relative to those of phosphate ions as expressed by the following equation, in the starting metal phosphate is desired to be from $\frac{1}{3}$ to $\frac{3}{4}$:

$$E = \Sigma i \times Ei/3 \times N_p$$

(wherein $N_p$ represent number of phosphor atoms in said metal phosphate, i the valence of each metal and Ei the number of the metal having a valence of i).

The polyvalent metal carbonates to be used in the present invention are exemplified by magnesium carbonate, calcium carbonate, strontium carbonate, barium carbonate, zinc carbonate, iron carbonate, cobalt carbonate, zirconium carbonate, basic magnesium carbonate, basic cobalt carbonate and the like. The carbonates to be used in the present invention are required to be those of a metal having the valence of two or more in order that they can function simultaneously as a foaming agent which generates carbon dioxide by reaction with the aforesaid phosphate and as a hardening agent for setting said metal phosphate.

The quantity of the carbonates to be used in the present invention is intimately related with the M/P ratio and the equivalent ratio E as described above. Namely, when a metal phosphate having larger M/P ratio and equivalent ratio E, the balance between foaming and setting can be maintained well by use of a small amount of the carbonate. On the other hand, when the M/P ratio and equivalent ratio E are smaller, it is necessary to use a relatively large amount of the carbonate in order to maintain good balance between foaming and setting. By analysis of the data obtained, it has now been found that satisfactory results can be obtained by increasing the equivalent ratio E of the starting metal phosphate which is within the range from $\frac{1}{3}$ to $\frac{3}{4}$ to the range from 0.65 to 0.95 by addition of the carbonate. Further, for the purpose of generating bubbles of carbon dioxide to effect sufficient expansion, it is also desirable to use the carbonate in a quantity sufficient to increase the equivalent ratio by at least 0.06, preferably 0.15 or more. While satisfying the requirements as mentioned above, from 5 to 50 parts by weight of the carbonate are generally used per 100 parts by weight of the metal phosphate.

According to a preferred embodiment of the present invention, the process of the present invention is practiced by first forming an aqueous solution or dispersion of the aforesaid metal phosphate. It is important to mix homogeneously the components and it is also important that the resultant aqueous solution or dispersion should have an appropriate viscosity. If the viscosity is too low, there may occur shrinkage of foamed product before setting. On the other hand, if the viscosity is too high, it is difficult to mix with the foaming agent. In either of such cases, no favorable foamed product can be obtained. For obtaining a suitable viscosity, from 20 to 200 parts by weight of water is used per 100 parts by weight of the aforesaid phosphate or modified phosphate. Furthermore, analysis of the data shows that the most favorable result can be obtained by adding the carbonate to an aqueous solution or dispersion of the phosphate or modified phosphate, in which the M/P ratio is from $\frac{1}{3}$ to 3/2, the equivalent ratio E is from $\frac{1}{3}$ to $\frac{3}{4}$ and said M/P ratio is not less than the equivalent ratio E and not more than $\frac{2}{3}$ times the equivalent ratio E, in an amount to increase the equivalent ratio E by at least 0.06 to an equivalent ratio E of the resultant foam within the range from 0.65 to 0.95.

The aqueous solution or dispersion of the metal phosphate having the composition within the preferred range as mentioned above can exist stably on storage for a long time and shows no self-setting tendency. Such a stable aqueous solution or dispersion of the metal phosphate is found to be foamable to a high degree of expansion and simultaneously settable by addition of the metal carbonate as mentioned above. Usually, the aforesaid carbonate is added while stirring at a high speed the aqueous phosphate solution or dispersion to be completely mixed therewith and the resultant mix is cast in a mold of a desired shape to allow foaming and setting at normal temperature. Within several seconds to some 10 minutes after mixing, foaming usually commences and complete setting occurs within 10 minutes to 10 hours. The degree of expansion, the speed of expansion and the speed of setting can freely controlled by varying the composition of the phosphate, the carbonate to be employed and its amount and the stirring speed at the time of mixing. Foamed products with an expansion ratio of 5 to 40 times can generally be obtained.

The inorganic foam of the present invention may further contain conventional reinforcing materials or fillers to improve mechanical strength thereof, such as glass fibers, myca, asbestos, silica baloon, pearlite and others.

The particular feature of the present invention can further be exhibited by making into a composite with other materials. As mentioned above, the composition of the present invention is foamable under conditions of normal temperature and pressure and therefore there can simply be obtained a composite by casting the composition into the space between other materials and allowing it to expand and set. This is also one of the remarkable effects of the present invention which is entirely impossible according to the inorganic foams of prior art. Thus, by casting the composition into a space defined between other materials having various complicated structures, including not only plane structure but also other structures such as curved structure or honeycomb structure and permitting said composition to foam and set, there can be obtained composite materials with light weight and excellent thermal insulating property which can be utilized for various uses, especially as lagging material. Such lagging material prepared from the inorganic foam of the present invention can have the foam supported on or contained in a shaped article made of other mateirals. The lagging material may be prepared in various shapes such as sheets or blocks and may also be placed or sandwiched between other materials. Furthermore, in practicing the present invention, it is not required to use a large scale equipment and therefore the composition of the present invention in useful for thermal insulating material for heat reservoir, thermal insulating material for ship or fire-retardant thermal insulating material for steel-frame, for which structural fabrication is desired to be accomplished at the site where the composition is prepared.

Other materials as mentioned above to be used in combination with the present composition may include metals, glasses, cement products, gypsum products, plastic materials, woods, papers, cloths and others. The inorganic foam shows excellent adhesiveness with these other materials.

The present invention is illustrated in further detail by the following Examples, in which all parts and "%" are by weight and thermal conductivity is measured by the method according to ASTM-C 518.

EXAMPLE 1

| | |
|---|---|
| Primary aluminum phosphate (50% aqueous solution) | 150 parts |
| Tertiary magnesium phosphate | 50 parts |
| Tertiary calcium phosphate | 40 parts |

The above components with M/P ratio=0.91, E ratio=0.67 are completely mixed at normal temperature and then mixed completely with 20 parts of basic magnesium carbonate. The mixture is taken out and left to stand. Foaming begins immediately and has substantially completed within 15 minutes to obtain a foam (M/P=1.07, E=0.77). The properties of the foam are shown in Table 1. Thermal conductivity is measured at average temperature of 35° C. and evaluation of heat resistance is conducted by the changes after leaving the foam in an electric surface set at 1000° C. for 2 hours. For comparison, the properties of polystyrene foam (Styrofoam: trade mark) are also shown in Table 1.

Table 1

| Sample | Expansion ratio | Specific gravity | Thermal conductivity (kcal/m.hr.°C.) | Heat resistance |
|---|---|---|---|---|
| Example 1 | 19.5 | 0.11 | 0.035 | no change at 1000° C. for 2 hours |
| Polystyrene foam | 25.0 | 0.04 | 0.030 | completely deformed at 110° C. after 5 minutes |

EXAMPLES 2-3, COMPARATIVE EXAMPLES 1-2

| | |
|---|---|
| Phosphoric acid (75% aqueous solution) | 91.4 parts |
| Aluminum hydroxide | 11.4 parts |
| Zinc oxide | 11.4 parts |
| Magnesium oxide | 7.5 parts |

The above components are completely mixed and reacted at normal temperature to obtain a transparent, viscous solution with M/P ratio=0.66 and E=0.50.

Then, this solution is mixed with various parts of calcium carbonate as shown in Table 2.

Table 2

| | Comparative Ex. 1 | Ex. 2 | Ex. 3 | Comparative Ex. 2 |
|---|---|---|---|---|
| Amount of calcium carbonate | 4 parts | 23 parts | 34 parts | 51 parts |

The properties of the foams obtained are shown in Table 3.

Table 3

| | Specific gravity | M/P | E | Thermal conductivity (kcal/m.hr.°C.) | Foaming |
|---|---|---|---|---|---|
| Comparative example 1 | — | 0.73 | 0.54 | — | foamed, but not set |

Table 3-continued

| | Specific gravity | M/P | E | Thermal conductivity (kcal/m.hr.°C.) | Foaming |
|---|---|---|---|---|---|
| Example 2 | 0.09 | 1.00 | 0.72 | 0.038 | uniform discrete cells average cell size 2.1 mm |
| Example 3 | 0.05 | 1.16 | 0.83 | 0.033 | uniform discrete cells average cell size 1.5 mm |
| Comparative example 2 | — | 1.40 | 0.99 | — | impossible to mix |

EXAMPLES 4-9

Various aqueous metal phosphate compositions as shown in Table 4 are prepared.

Table 4

| | Ex. 4 | Ex. 5 | Ex. 6 | Ex. 7 | Ex. 8 | Ex. 9 |
|---|---|---|---|---|---|---|
| Phosphoric acid (75% aqueous solution) | 140 parts | 140 parts | 140 parts | 140 parts | 160 parts | 160 parts |
| Aluminum hydroxide | 40 parts | 30 parts | 25 parts | 20 parts | 20 parts | 20 parts |
| Magnesium oxide | 10 parts | 20 parts | 25 parts | 30 parts | — | — |
| Zinc oxide | — | — | — | — | 35 parts | 35 parts |
| Sodium hydroxide | — | — | — | — | — | 40 parts |
| Water | 50 parts | 50 parts | 50 parts | 50 parts | — | 20 parts |
| M/P | 0.70 | 0.81 | 0.87 | 0.93 | 0.55 | 1.38 |
| E | 0.63 | 0.66 | 0.68 | 0.70 | 0.44 | 0.72 |

All of these metal phosphate compositions are stable solutions and neither increase of viscosity nor setting is observed in any of these compositions after 24 hours.

To each composition is added basic magnesium carbonate in various parts as shown in Table 5.

Each mixture is well mixed to obtain respective foam. The properties of each foam are shown in Table 5.

Table 5

| | Ex. 4 | Ex. 5 | Ex. 6 | Ex. 7 | Ex. 8 | Ex. 9 |
|---|---|---|---|---|---|---|
| Basic magnesium carbonate | 40 parts | 35 parts | 30 parts | 25 parts | 80 parts | 20 parts |
| M/P | 1.08 | 1.15 | 1.16 | 1.17 | 1.23 | 1.59 |
| E | 0.89 | 0.88 | 0.87 | 0.86 | 0.89 | 0.83 |
| Specific gravity | 0.08 | 0.07 | 0.07 | 0.06 | 0.04 | 0.09 |
| Average cell size | 1.1 mm | 1.0 mm | 1.5 mm | 1.0 mm | 1.5 mm | 2.0 mm |

COMPARATIVE EXAMPLES 3-5

Various metal phosphate compositions as shown in Table 6 are prepared.

Table 6

| | Comparative example 3 | Comparative example 4 | Comparative example 5 |
|---|---|---|---|
| Primary aluminum phospahate (50% aqueous solution) | 100 parts | 100 parts | 100 parts |
| Magnesium oxide | 12.9 parts | — | — |
| Zinc oxide | — | 26.9 parts | — |
| Calcium silicate | — | — | 100 parts |
| M/P | 1.00 | 1.03 | 2.1 |
| E | 0.78 | 0.80 | 1.5 |

All of these metal phosphate compositions are unstable and set in a few minutes. With these compositions, substantially no foaming occurs by addition of a polyvalent metal carbonate.

COMPARATIVE EXAMPLE 6

| | |
|---|---|
| Primary aluminum phosphate (50% aqueous solution) | 100 parts |
| Calcium silicate | 100 parts |

The above components (M/P=2.1, E=1.5) are completely mixed and then mixed completely with 10 parts of calcium carbonate prior to complete setting of above components.

The properties of the obtained foam are shown in Table 7.

Table 7

| Specific gravity | Average cell size | Thermal conductivity (kcal/m . hr . °C.) |
|---|---|---|
| 0.48 | 5.0 mm | 0.115 |

The above results of Comparative examples 3-6 show that there can be obtained no highly expanded foam with small specific gravity from a self-setting starting composition with M/P ratio and E ratio exceeding the ranges of the present invention.

COMPARATIVE EXAMPLE 7

Example 1 is repeated except that sodium carbonate is used instead of basic magnesium carbonate in the same amount.

Foaming occurs but the composition is not hardened even after a long period of time, failing to give a solidified foam. Thus, it is critical to use a polyvalent metal carbonate which also functions as a hardening agent.

EXAMPLE 10

| | |
|---|---|
| Primary zinc phosphate (50% aqueous solution) | 450 parts |
| Tertiary magnesium phosphate | 150 parts |
| Tertiary calcium phosphate | 120 parts |

The above components with M/P ratio=1.01, E=0.68 are completely mixed and further mixed completely with addition of 75 parts of magnesium carbonate.

The resultant mixture is cast into annular space between double walls formed by double pipes of steel erected vertically (outer pipe being 300 mm in height, 100 mm in diameter and 1 mm thick; inner pipe being 300 mm in height, 50 mm in diameter and 1 mm thick). After 10 seconds, foaming begins until setting is completed after 45 minutes. The space between the double walls is completely filled with the foam (M/P=1.22, E=0.81) which is strongly adhered to the walls. A part of the foam is taken out for measurement of expansion ratio, which is found to be 18.5.

EXAMPLE 11

| | |
|---|---|
| Phosphoric acid (75% aqueous solution) | 80 parts |
| Aluminum hydroxide | 15 parts |
| Zinc oxide | 25 parts |

The above components are completely mixed and reacted to prepare a transparent viscous solution with M/P ratio=0.79, E=0.66. Five parts of glass fibers (produced by Asahi Glass Fiber Co., Japan) are added to this solution and completely dispersed therein. Then, the mixture is mixed with 20 parts of basic magnesium carbonate. When the mixture is taken out and left to stand, foaming begins immediately and is completed substantially after 10 minutes. The resultant foam (M/P=1.13, E=0.87) is found to have a density of 0.09 g/cm$^3$, thermal conductivity of 0.039 kcal/m.hr.°C. and compression strength of 2.0 kg/cm$^2$.

What we claim is:

1. An inorganic foam comprising metallic salts of phosphoric acid, being characterized in that:
   (a) the ratio of the total number of metal atoms constituting said salts to that of phosphorus atoms is in the range from $\frac{2}{3}$ to 2/1;
   (b) the metal constituting said salts comprises at least one polyvalent metal and the equivalent ratio of the total valences of the metal relative to the total valences of phosphate ion is from 0.65 to 0.95;
   (c) said foam consists of discrete cells with an average diameter of 3 mm or less; and
   (d) said foam has a specific gravity of 0.15 or less.

2. An inorganic foam as in claim 1, wherein the polyvalent metal is at least one selected from the group consisting of di-valent and tri-valent metals.

3. An inorganic foam as in claim 2, wherein the polyvalent metal contains magnesium, zinc, aluminum or a combination thereof.

4. An inorganic foam as in claim 3, wherein the polyvalent metal further contains calcium.

5. An inorganic foam as in claim 1, wherein the metal phosphate further contains at least one alkali metal.

6. An inorganic foam as in claim 1, wherein there is incorporated at least one additive selected from the group consisting of reinforcing materials and fillers.

7. A process for producing an inorganic foam comprising metallic salts of phosphoric acid by foaming and setting at normal temperatures a foamable composition comprising:
   (A) a metal phosphate containing at least one polyvalent metal, the ratio of the total number of metallic atoms to the number of phosphorus atoms in said metal phosphate being from $\frac{1}{3}$ to 3/2 and the equivalent ratio of the total valences of the metallic atoms to the total valences of phosphate ions in said metal phosphate from $\frac{1}{2}$ to $\frac{3}{4}$;
   (B) a polyvalent metal carbonate; and
   (C) water, the amount of the polyvalent metal carbonate (B) being controlled within the range such that the ratio of the total number of metallic atoms to the number of phosphorus atoms in the resultant foam may be from $\frac{2}{3}$ to 2/1 and the equivalent ratio of the total valences of the metallic atoms to the total valences of phosphate ions in said resultant foam may be from 0.65 to 0.95.

8. A process for producing an inorganic foam as in claim 7, wherein the polyvalent metal is at least one selected from the group consisting of di-valent and tri-valent metals.

9. A process for producing an inorganic foam as in claim 8, wherein the polyvalent metal contains magnesium, zinc, aluminum or a combination thereof.

10. A process for producing an inorganic foam as in claim 9, wherein the polyvalent metal further contains calcium.

11. A process for producing an inorganic foam as in claim 7, wherein the metal phosphate further contains at least one alkali metal.

12. A process for producing an inorganic foam as in claim 7, wherein the metal phosphate is modified with oxides, hydroxides or silicates of mono- or poly-valent metals.

13. A process as in claim 7, wherein the composition further contains an additive selected from the group consisting of reinforcing materials and fillers.

14. A process as in claim 7, wherein the polyvalent metal carbonate is at least one selected from the group consisting of magnesium carbonate, calcium carbonate, strontium carbonate, barium carbonate, zinc carbonate, iron carbonate, cobalt carbonate, basic magnesium carbonate, basic zinc carbonate and basic cobalt carbonate.

15. A lagging material comprising the inorganic foam as claimed in claim 1.

16. A lagging material as in claim 15, having the inorganic foam supported on or contained in a shaped article made of other materials.

17. A lagging material as in claim 16, wherein the inorganic foam is shaped in a sheet or a block.

18. A lagging material as in claim 17, wherein the inorganic foam is sandwiched between sheets of other materials.

* * * * *